United States Patent [19]
Fox

[11] 3,785,330
[45] Jan. 15, 1974

[54] AIR DRIVEN VEHICLE

[76] Inventor: Robert M. Fox, 30518 Freda, Warren, Mich. 48093

[22] Filed: Apr. 21, 1972

[21] Appl. No.: 246,298

[52] U.S. Cl............................... 115/70, 180/3
[51] Int. Cl........................................ B62m 27/02
[58] Field of Search................... 115/70, 1 R; 180/3; 114/66.5 R, 66.5 F; 9/2 C, 2 R, 2 S

[56] References Cited
UNITED STATES PATENTS
3,583,507  6/1971  Trautwein............................. 108/3
3,480,289  11/1969  Larkin................................... 108/3

*Primary Examiner*—Milton Buchler
*Assistant Examiner*—Charles E. Frankfort
*Attorney*—Gerald E. McGlynn, Jr. et al.

[57] ABSTRACT

An air powered vehicle including a frame having a longitudinally extending central member which extends from the front of the vehicle rearwardly and upwardly in arcuate configuration to upper rear end. A transversly extending lower outrigger member is attached to the central member toward the front end of the central member and upper transversely extending outrigger member is disposed toward the rear of the central member. A vertical support member extends upwardly from the central member and supports the upper outrigger. A motor mounting means is disposed at the rear upper end of the central member and is defined in part by the upper outrigger member whereby a motor is supported at the rear upper end of the central member. A steerable surface engaging assembly is disposed at the front end of the central member and side surface engaging assemblies are connected to the outriggers and the frame by struts, connecting rods and pivotably interconnected links.

12 Claims, 5 Drawing Figures

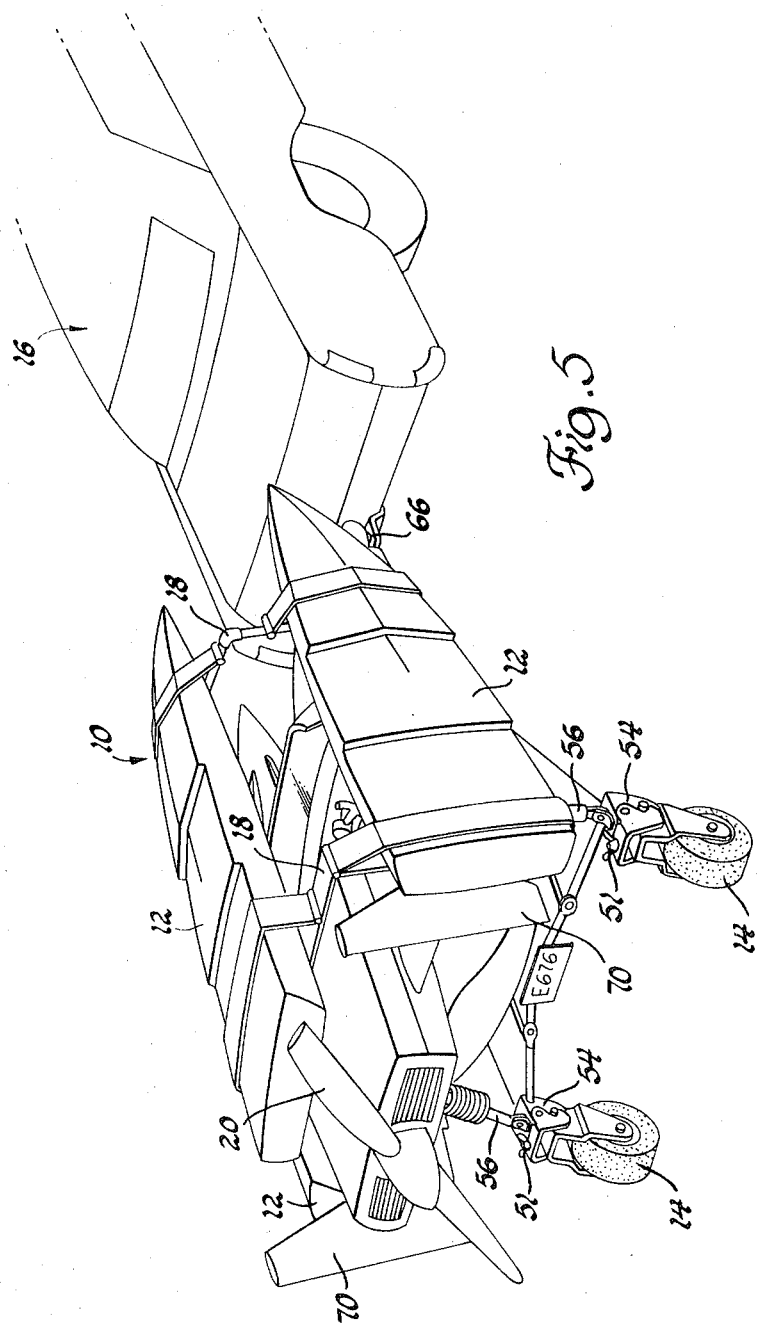

3,785,330

AIR DRIVEN VEHICLE

The instant invention relates to an air powered vehicle or surface craft which is capable of traveling over snow, ice, land and water.

Numerous air powered vehicles are known to the prior art. Most of these vehicles are designed for specific uses such as being specifically designed for use on water. By comparison, most of the prior art air powered vehicles are more difficult and more expensive to fabricate than the air powered vehicle of the instant invention.

Accordingly, it is an object and feature of the instant invention to provide an improved air powered vehicle which is very versatile in that it may be used on land, water, ice or snow.

In correlation with the foregoing object and feature, it is another object and feature of this invention to provide an improved air powered vehicle having a novel frame which is simple and efficiently and economically fabricated.

In correlation with the foregoing objects and features, it is another object and feature of this invention to provide an air powered vehicle assembly which includes a frame having a central member extending from the front end rearwardly and upwardly to and upper rear end, and transversely extending outrigger means attached to the central member.

In correlation with the foregoing objects and features, it is another object and feature of this invention to provide such vehicle assembly including motor mounting means disposed at the rear end of the central member.

Other objects and attendant advantages of the present invention will be readily appreciated as the same becomes better understood by reference to the following detailed description when considered in connection with the accompanying drawings wherein:

FIG. 5 is a perspective view of the preferred embodiment of the instant invention in a trailing configuration.

Figure 1:
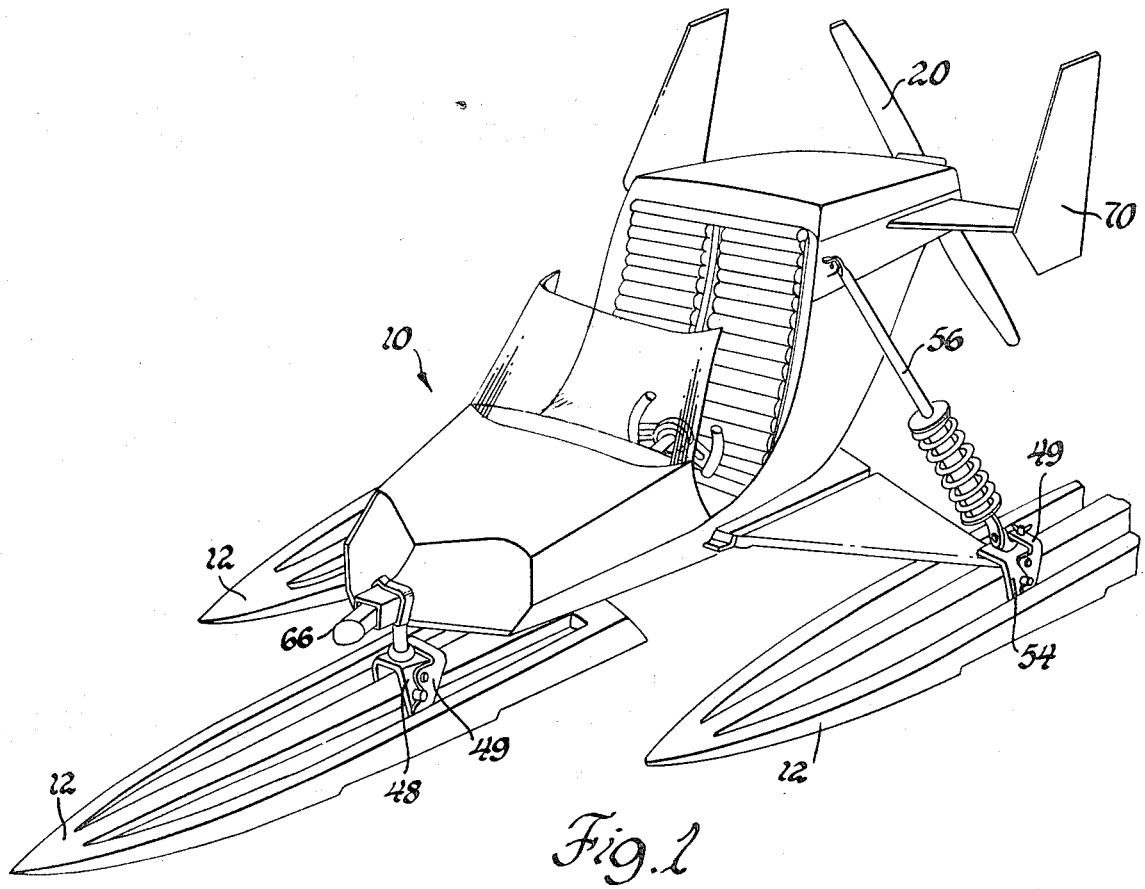
FIG. 1 is a perspective view of a preferred embodiment of the air powered vehicle of the instant invention fitted with pontoons for movement on water.
Figure 2:
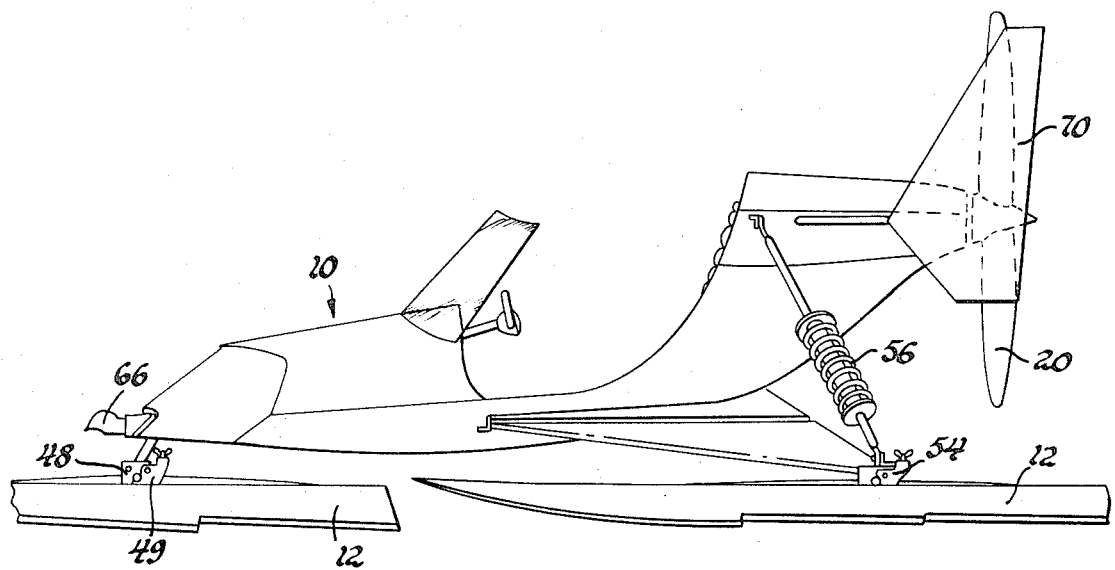
FIG. 2 is a side elevational view of the preferred embodiment.

Referring now to the drawings wherein like numerals indicate like or corresponding parts throughout the several views, an air powered vehicle assembly constructed in accordance with the instant invention is generally shown at 10. As illustrated in FIGS. 1 and 2 the air powered vehicle assembly of the instant invention is fitted with pontoons 12 for movement over water. As illustrated in FIG. 5, the pontoons may be replaced with wheels 14 for trailing by an automobile generally indicated at 16 or for movement over land. As illustrated in FIG. 5 the pontoons 12 may be secured to the body assembly by removable pontoon carriers such as those shown at 18. The assembly includes a propeller 20 which is driven by an engine 21 disposed within the engine compartment 22.

Figure 3:
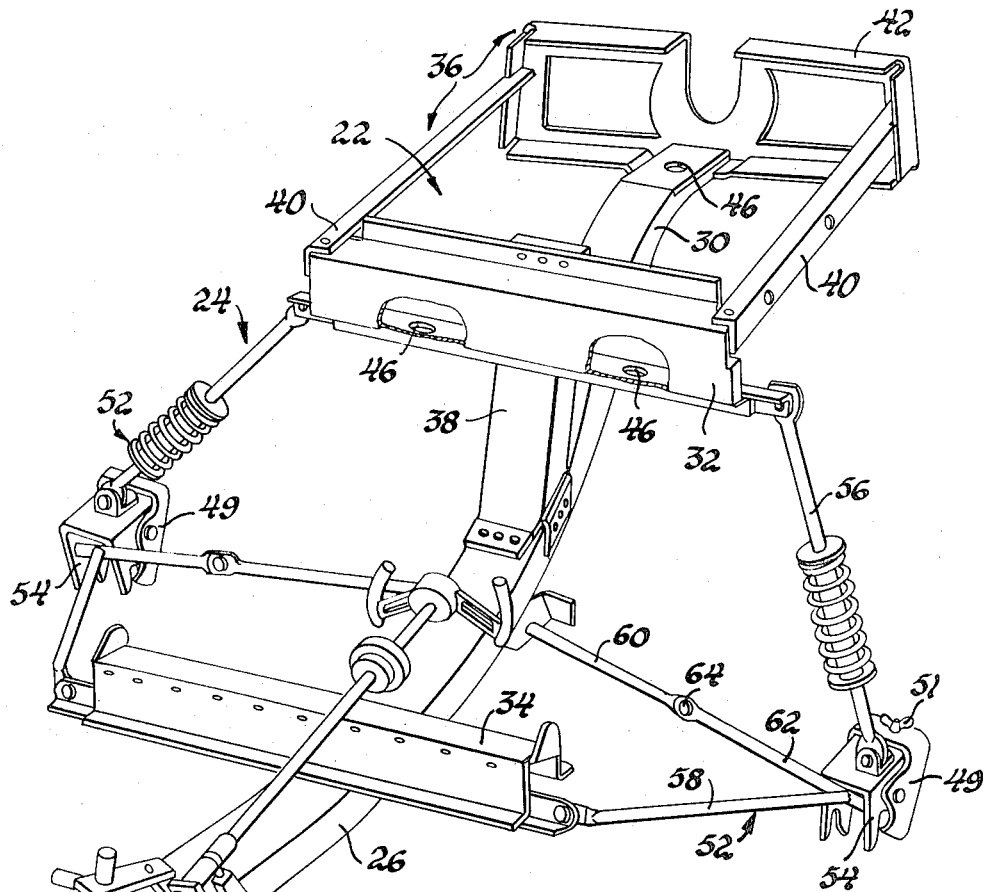
FIG. 3 is perspective view of the frame utilized in the preferred embodiment of the instant invention.
Figure 4:
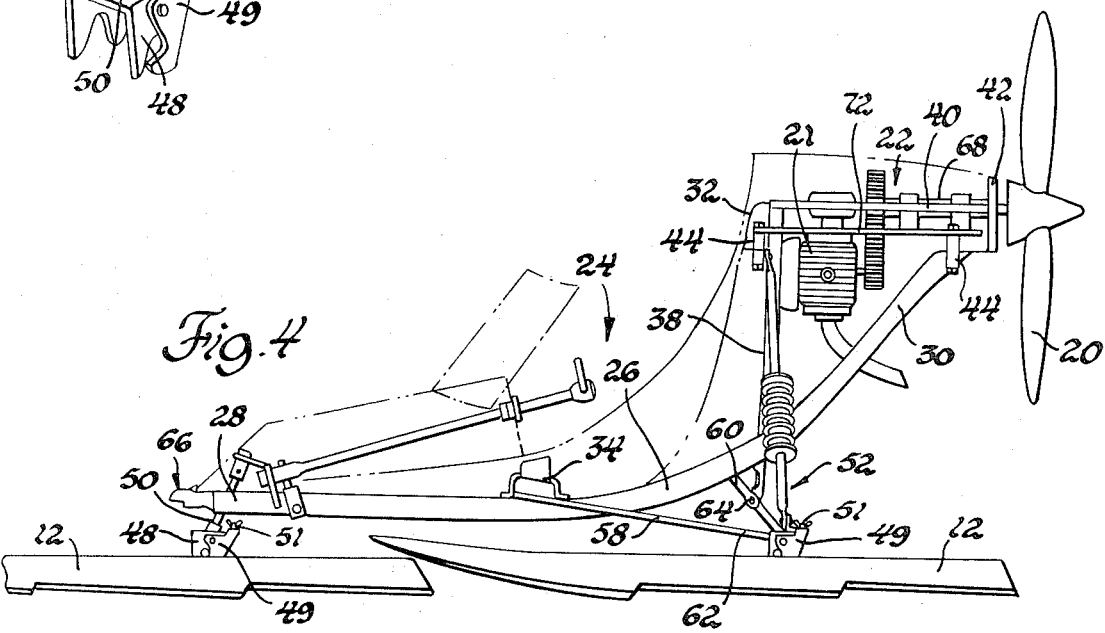
FIG. 4 is a side elevational view of the frame shown in FIG. 3 and including an engine.

The vehicle assembly as best illustrated in FIGS. 3 and 4 includes a frame generally indicated at 24. The body which may be made of plastic, metal or the like, is secured to and disposed about the frame 24.

The frame 24 includes a central channel member 26 which extends longitudinally of the vehicle from a front end 28 rearwardly and upwardly to an upper rear end 30. The lower front end 28 of the central member 26 is generally horizontal in the vehicle and the central member extends upwardly in an arcuate configuration to the upper rear end 30. The central member 26 is the main structural member of the assembly.

The frame also includes transversely extending outrigger means attached to the central member 26, such outrigger means including an upper outrigger member 32 and the lower outrigger member 34.

The frame also includes motor mounting means generally indicated at 36 disposed at the rear end of the central member 26. A vertical support member 38 extends upwardly from the central member 26 in the arcuate portion thereof. The upper outrigger member 32 is supported atop of the vertical support member 38 and forms a part of the motor mounting means 36. In other words, the motor mounting means 36 is a box like configuration the forward end of which is defined by the outrigger member 32. The lower outrigger member 34 is attached to the central member 26 adjacent the horizontal portion thereof. The various members of the frame are made of metal and are welded or otherwise fastened together. The motor mounting means 36 includes a pair of parallel side members 40 which extend rearwardly from the upper outrigger member 32 to a rear cowl 42. These structural members 40 and 42 also support the exterior skin, covers and aerodynamic stabilizers 70. As best illustrated in FIG. 4 an engine 21 and the propeller jack shaft 68 are solidly mounted to the mounting plate 72. The mounting plate 72 in turn is isolated from the upper outrigger 32 by means of three vibration dampening absorbers 44 located at the mounting holes 46 shown in FIG. 3.

The pontoons 12 define surface engaging means operatively connected to the frame 24 for supporting the assembly during travel. As alluded to hereinbefore, the surface engaging means may take the form of pontoons 12, wheels 14, skis, skates or the like, so that the vehicle may be moved over land, water, ice or snow.

The surface engaging means includes a front steerable surface engaging assembly operatively connected to the front end 28 of the central member 26. The steerable surface engaging assembly may include the front pontoon 12, a front wheel 14, a front ski, skate or the like, all of which may be attached to the frame by a clevis 48. The front steerable surface engaging assembly includes a shaft 50 rotatably supported by the central member 26. The shaft 50 has an axis inclined forwardly and downwardly as best illustrated in FIG. 4. The forward and downward inclination of the shaft 50 allows the steerable surface connected to the clevis 48 to bank during a turn rather than merely rotating about a vertical axis.

The surface engaging means further includes the pair of side surface engaging assemblies taking the form of the side pontoons 12 or side wheels 14 which are disposed outboard of the upper and lower outrigger members 32 and 34. Suspension means generally shown at 52 operatively interconnects the side surface engaging assemblies and the frame, the side surface engaging assemblies being attached to the clevises 54. The suspension means 52 includes a strut 56 extending from each end of the upper outrigger member 32 and attached to the adjacent clevis 54 for supporting the adjacent side surface engaging assembly. Each strut 56 is pivotably connected at its upper end to the upper outrigger member 32 and is pivotably connected at its lower end to the adjacent clevis 54. Furthermore, each strut 56 is yieldable. In other words, each strut 56 takes the form of a shock absorber.

The suspension means 52 further includes a connecting rod 58 pivotably connected to the lower outrigger member 34 and extending to and rigidly attached to the adjacent clevis 54 which in turn supports the adjacent side surface engaging assembly. The suspension means 52 also includes a plurality of pivotably connected links 60 and 62 extending from each side of the central member 26 to the adjacent clevis 54 of the adjacent side surface engaging assembly. Link 60 is rigidly attached to the central member 26 and is pivotably connected at 64 to the link 62 which is in turn solidly mounted to the adjacent clevis 54. The pivotably axis of the connection 64 is in line in the rearward or forward direction with the pivotably connection of the connecting rod 58 to the lower outrigger member 34. The pivot centerlines at the top and bottom of strut 56 are also parallel with the aforesaid pivotably axis through connection 64. Such a suspension of the assembly will provide movement of side surface in a banking fashion in conjunction with the banking movement of the front steerable surface; thereby providing improved stability on ice, snow and water. The surface engaging assemblies are locked in the clevises 48 and 54 by means of a pivotable hook latch 49. The hook latch 49 is secured by means of the thumb screw 51.

For trailering the assembly a hitch assembly generally indicated at 66 is attached to the front end 28 of the central member 26 to facilitate towing of the vehicle assembly as best illustrated in FIG. 5.

As best seen in FIGS. 1 and 2 the vehicle is a two place vehicle having a narrow forward nose with the body increasing in dimension rearwardly and then decreasing in dimension upwardly and rearwardly to and through the engine compartment 22. As related hereinbefore, the body may be made of metal or plastic. Further as illustrated in FIGS. 1 and 2 the passenger compartment is open, however, it will be understood that it may be closed by having a top and side doors.

Preferably the seat is a hammock type seat the upper end of which is attached to the upper outrigger member 32 and the lower end of which is attached to the lower outrigger member 34.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that with the scope of the appended claims, the invention may be practiced otherwise than as specifically described.

The embodiments of the invention in which an exclusive property or privilege is claimed are defined as follows:

1. An air powered vehicle assembly comprising; a frame including a central member extending from a front end rearwardly and upwardly to an upper rear end, transversely extending outrigger means attached to said central member, motor mounting means disposed at said rear end of said central member, and at least one support member extending upwardly from said central member, said outrigger means including an upper outrigger member supported atop of said support member and forming a part of said motor mounting means.

2. An assembly as set forth in claim 1 wherein said central member extends upwardly in an arcuate configuration.

3. An assembly as set forth in claim 1 wherein said outrigger means further includes a lower outrigger member attached to said central member.

4. An assembly as set forth in claim 3 including surface engaging means operatively connected to said frame for supporting said assembly during travel.

5. An assembly as set forth in claim 4 wherein said surface engaging means includes a front steerable surface engaging assembly operatively connected to said front end of said central member.

6. An assembly as set forth in claim 5 wherein said front steerable surface engaging assembly includes a shaft rotatably supported by said central member, said shaft having axis inclined forwardly and downwardly.

7. An assembly as set forth in claim 5 wherein said surface engaging means further includes a pair of side surface engaging assemblies disposed outboard of said upper and lower outrigger members, and suspension means operatively interconnecting said side surface engaging assemblies and said frame.

8. An assembly as set forth in claim 7 wherein said suspension means includes a strut extending from each end of said upper outrigger member and attached to the adjacent side surface engaging assembly.

9. An assembly as set forth in claim 8 wherein each of said struts is yieldable.

10. An assembly as set forth in claim 9 including a hitch assembly attached to said front end of said central member for towing said vehicle.

11. An assembly as set forth in claim 8 wherein said suspension means further includes a connecting rod pivotally connected to each end of said lower outrigger member and extending to the adjacent side surface engaging assembly.

12. An assembly as set forth in claim 11 wherein said suspension means further includes a plurality of pivotably connected links extending from each side of said central member to the adjacent side surface engaging assembly.

* * * * *